(12) United States Patent
Goleski et al.

(10) Patent No.: US 9,759,302 B2
(45) Date of Patent: Sep. 12, 2017

(54) BYPASS CLUTCH FOR A TORQUE CONVERTER

(71) Applicant: Ford Global Technologies, LLC, Dearborn, MI (US)

(72) Inventors: Gregory Daniel Goleski, Rochester Hills, MI (US); Steven Anatole Frait, Milan, MI (US); Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/005,249

(22) Filed: Jan. 25, 2016

(65) Prior Publication Data
US 2017/0211674 A1  Jul. 27, 2017

(51) Int. Cl.
*F16H 45/02* (2006.01)
*F16D 13/52* (2006.01)
*F16D 25/0638* (2006.01)

(52) U.S. Cl.
CPC ............ *F16H 45/02* (2013.01); *F16D 13/52* (2013.01); *F16D 25/0638* (2013.01); *F16H 2045/0284* (2013.01)

(58) Field of Classification Search
CPC .. F16H 45/02; F16H 2045/0284; F16D 13/52; F16D 25/0638
See application file for complete search history.

(56) References Cited

U.S. PATENT DOCUMENTS

| 3,224,537 A | 12/1965 | Hilpert | |
|---|---|---|---|
| 4,860,861 A * | 8/1989 | Gooch | F16H 45/00 192/113.36 |
| 5,305,863 A * | 4/1994 | Gooch | F16D 25/0638 192/113.3 |
| 6,035,989 A * | 3/2000 | Matsuoka | F16D 25/0638 192/106 F |
| 8,002,663 B2 | 8/2011 | Nishida et al. | |
| 8,215,470 B2 * | 7/2012 | Ishikawa | F16D 25/0638 192/113.34 |
| 8,499,912 B2 * | 8/2013 | Samie | F16H 45/02 192/3.3 |
| 8,727,088 B2 | 5/2014 | Takeshima et al. | |

(Continued)

*Primary Examiner* — Jacob S Scott
*Assistant Examiner* — Tinh Dang
(74) *Attorney, Agent, or Firm* — James Dottavio; Brooks Kushman, P.C.

(57) ABSTRACT

A transmission includes a case having a front support that defines a reservoir, and a first passageway in fluid communication with the reservoir. The transmission also includes a torque converter having a bypass clutch having a piston disposed between a balance chamber and an apply chamber. The clutch fixes the turbine to the impeller in response to fluid pressure in the apply chamber exceeding fluid pressure in the balance chamber. The transmission further includes a hollow stator shaft fixed to the front support and a turbine shaft driveably connected to the turbine. The turbine shaft extends through the stator shaft and defines a second passageway in fluid communication with the first passageway and the balance chamber. The reservoir, the first passageway, the second passageway, and the balance chamber are arranged such that fluid travels from the reservoir to the balance chamber when the piston is de-stroked.

20 Claims, 7 Drawing Sheets

(56) References Cited

U.S. PATENT DOCUMENTS

| | | | | |
|---|---|---|---|---|
| 8,851,245 B2* | 10/2014 | Bielis, IV | ............ | F16D 65/127 188/218 XL |
| 8,863,923 B2* | 10/2014 | Kaneko | .................. | F16H 45/02 192/110 B |
| 8,935,439 B2 | 1/2015 | Murasawa et al. | | |
| 8,939,257 B2 | 1/2015 | Nakamura et al. | | |

\* cited by examiner

BYPASS CLUTCH FOR A TORQUE CONVERTER

TECHNICAL FIELD

This disclosure relates to the field of automatic transmissions for motor vehicles. More particularly, the disclosure pertains to bypass clutches for torque converters.

BACKGROUND

Many vehicles are used over a wide range of vehicle speeds, including both forward and reverse movement. Most engines are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Automatic transmissions may include a torque converter for coupling a transmission input shaft to the crankshaft of the engine. To improve power transfer efficiency once the vehicle reaches a sufficient speed, a controller may engage a bypass clutch to selectively couple the transmission input shaft to the impeller of the torque converter, which is fixed to the flywheel of the engine. The bypass clutch may include one or more clutch plates that rotate with the housing and interleaved with one or more plates that rotate with the input shaft. To engage the clutch, pressurized fluid forces a piston to compress the clutch plates.

SUMMARY

According to one embodiment, a transmission includes a case having a front support that defines a reservoir, and a first passageway in fluid communication with the reservoir. The transmission also includes a torque converter having an impeller, a turbine, and a stator. A bypass clutch is disposed within the torque converter and has a piston disposed between a balance chamber and an apply chamber. The clutch fixes the turbine to the impeller in response to fluid pressure in the apply chamber exceeding fluid pressure in the balance chamber. The transmission further includes a hollow stator shaft fixed to the front support and a turbine shaft driveably connected to the turbine. The turbine shaft extends through the stator shaft and defines a second passageway in fluid communication with the first passageway and the balance chamber. The reservoir, the first passageway, the second passageway, and the balance chamber are arranged such that fluid travels from the reservoir to the balance chamber when the piston is de-stroked.

According to another embodiment, a transmission includes a torque converter having a clutch with a piston, and balance and apply chambers partitioned from a hydrodynamic chamber of the torque converter. The transmission also includes a hollow turbine shaft extending into a nose portion of the torque converter. An on-axis reservoir is defined within the turbine shaft and the nose portion, and is in fluid communication with the balance chamber such that fluid from the reservoir refills the balance chamber when the piston is de-stroked.

According to yet another embodiment, a transmission includes a torque converter having a clutch with a piston, and balance and apply chambers partitioned from a hydrodynamic chamber of the torque converter. The transmission also includes a front support defining a reservoir having an elevated exhaust. A turbine shaft extends through the front support and defines a passageway in fluid communication with the balance chamber and the reservoir such that fluid from the reservoir refills the balance chamber when the piston is de-stroked.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
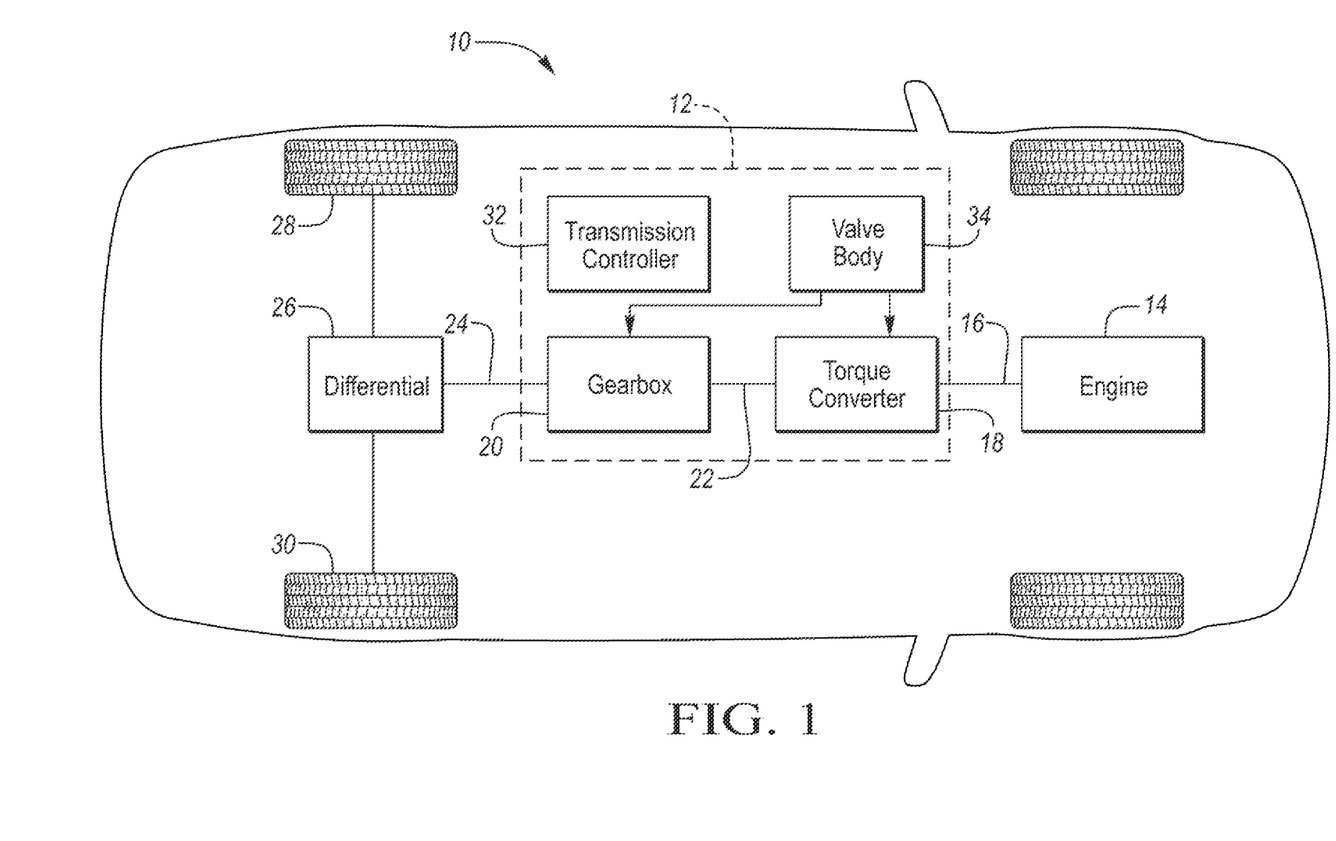
FIG. 1 is a schematic representation of a vehicle powertrain.

FIG. 1 illustrates a powertrain 10 with a transmission 12. The flow of mechanical power is illustrated by solid lines, while dashed lines indicate the flow of information signals, which may be conveyed electrically or hydraulically. Power is generated by an engine 14 and conveyed to a transmission input 16. A torque converter 18 and a gearbox 20 modify the speed and torque at which the power is delivered to match vehicle requirements while permitting the engine 14 to run at a suitable crankshaft speed. Power flows from the torque converter 18 to the gearbox via a turbine shaft 22. A driveshaft 24 transfers power from the transmission 12 to a differential 26. The differential 26 distributes the power between drive wheels 28 and 30 while allowing slight speed differences such as when turning a corner. Some transmissions, such as front wheel drive transaxles, may include the differential in the same housing with the gearbox and the torque converter. In such transmissions, power transfer to the differential may utilize gears or chains as opposed to a driveshaft. In some vehicles, a transfer case may be interposed between the transmission and differential to transfer some power to additional wheels.

A transmission controller 32 adjusts the state of transmission 12 based on various inputs, including vehicle speed measurements, driver torque demand as indicated by accelerator pedal position, and a shift selector. The controller 32 may adjust the state of the transmission by sending electrical signals to a valve body 34. In response to these signals, the valve body 34 adjusts the pressure in hydraulic circuits to engage particular clutches, such as clutches within the gearbox 20 and a bypass clutch within the torque converter 18.

Figure 2:
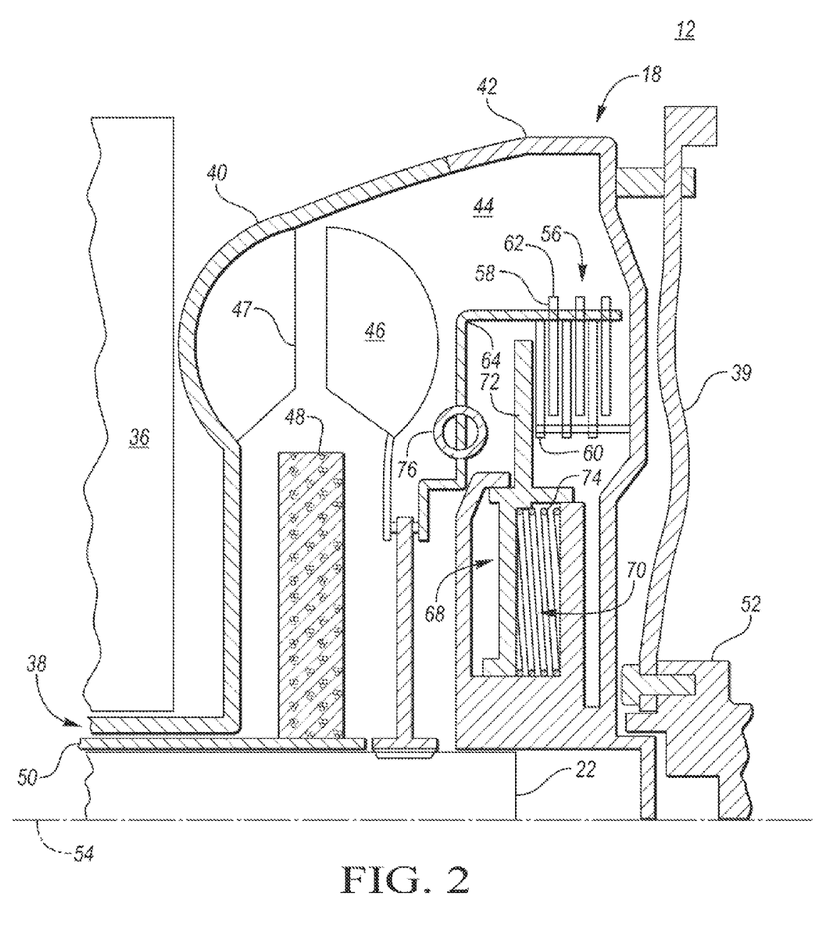
FIG. 2 is a cross section of a torque-converter assembly.

Referring to FIG. 2, a front portion of the transmission 12 is shown. The transmission 12 includes a front support 36 that is supported by a case of the transmission 12. The front support 36 defines a hole 38 that receives a portion of the impeller 40. A torque converter cover 42 is connected to the impeller 40, and is connected to the crankshaft 52 of the engine 14 via a flex plate 39. The impeller 40 and the cover 42 cooperate to define a hydrodynamic chamber 44, which is filled with fluid (e.g., oil) during operation of the transmission. A turbine 46 is disposed within the chamber 44 adjacent to the blades 47 of the impeller 40, and is connected (e.g., splined) to the turbine shaft 22 (also known as the transmission input shaft). A torsional damper may be interposed between turbine 46 and turbine shaft 22 to isolate gearbox 20 and other driveline components from engine vibrations.

A stator 48 is coupled to a stator shaft 50 via a one-way clutch. The stator shaft is fixed to the front support 36 and is stationary relative to the torque converter 18. When the turbine shaft is stationary or rotating slowly relative to the crankshaft 52 of the engine 14, the one-way clutch holds the stator 48 stationary. Rotation of the impeller 40 forces fluid to move between the impeller 40, the turbine 46, and the stator 48. The fluid exerts a hydrodynamic torque on the turbine 46. The stator 48 provides a reaction force such that the torque on the turbine 46 can be greater than the torque on the impeller 40. When the speed of the turbine 46 approaches that of the impeller 40, fluid tends to flow around the centerline 54, causing the one-way clutch to overrun.

The torque converter 18 includes a bypass clutch 56 disposed within the hydrodynamic chamber 44. The clutch 56 includes clutch pack 58 having a plurality of first plates 60 interleaved with a plurality of second plates 62. The first plates 60 are splined to, and rotate with the cover 42. The second plates 62 rotate with the turbine 46. The second plates 62 may be connected with the turbine 46 via a clutch shell 64. A dampener 76 may be disposed on the clutch shell 64.

To engage the clutch 56, pressurized fluid is routed to an apply chamber 68 forcing a piston 72 to compress the clutch pack 58. When the clutch pack 58 is compressed, the first and second plates 60, 62 frictionally engage locking the turbine shaft 22 to the cover 42; thus bypassing the torque converter. When the pressure is released, a spring 74 forces the piston 72 away from the clutch pack releasing the first and second plates to resume normal operation of the torque converter.

The clutch 56 also includes a balance chamber 70 disposed on a side of the piston 72 that is opposite the apply chamber 68. Fluid pressure in the balance chamber 70 tends to push the piston 72 away from the clutch pack 58. The balance chamber 70 may be filled with fluid at low pressure such that fluid pressurization due to centrifugal forces are canceled out. The controller 32 may partially apply the clutch 56 such that the speed difference between the cover 42 and the turbine shaft 22, called the slip, is a desired amount. During partial clutch application, some torque is transferred by the clutch 56 and the remainder of the input torque is transferred hydrodynamically via the impeller, stator, and turbine. Precise control of the torque capacity of the clutch 56 is required to maintain the desired slip.

The apply chamber 68 and the balance chamber 70 may be enclosed by the cooperation of the cover 42 and the piston 72 to partition the apply and balance chambers from the hydrodynamic chamber 44. For example, the cover 42 may include a portion 78 that cooperates with the piston 72 to define the apply chamber 68, and may include a portion 80 that cooperates with the piston 72 to define the balance chamber 70. This allows the apply and balance chamber 68, 70 to have different fluid pressures than each other, and to have different fluid pressures than the hydrodynamic chamber 44.

Figure 3:
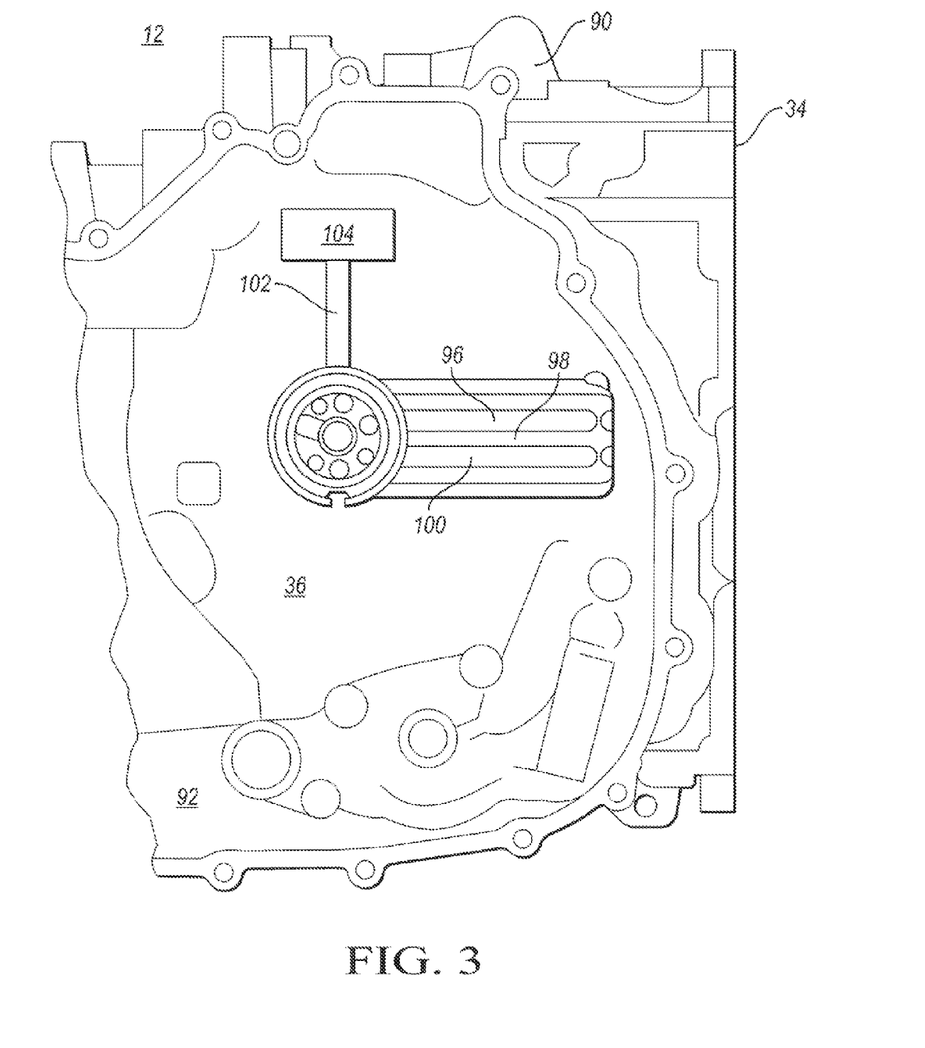
FIG. 3 is a front view of a transmission.

Referring to FIG. 3, the transmission 12 includes a case 90 having a front wall 92 that connects with the front support 36. The front support 36 defines a plurality of radial passageways, such as radial passageways 96, 98, 100 and 102, that may be integrally formed with the front support 36. Each passageway may extend radially away from the centerline 54 at a common axial position. The passageways may be separated circumferentially from one another. These passageways are utilized to transmit fluid to or from various places in torque converter 18. For example, passageway 96 is utilized to supply fluid to the hydrodynamic chamber 44, and passageway 98 is utilized to return fluid from the hydrodynamic chamber 44. Passageway 100 may be utilized to supply fluid to the apply chamber 68, and passageway 102 may be utilized to at least return fluid from the balance chamber 70. Passageway 102 is in fluid communication with an off-axis reservoir 104. Two chambers or passageways are in fluid communication if they are connected such that fluid is permit to flow substantially unimpeded from one to the other via a passageway or a series of connected passageways. Two chambers are not in fluid communication if the fluid must flow through valves or pumps. Pressure differences may exist between fluidly connected chambers due to centrifugal or gravitational head or flow resistance of intentional passageways. The reservoir 104 may be defined (completely or partially) within a wall of the front support 36. Alternatively, the reservoir could be defined within a wall or other portion of the case 90. Each of the passageways 96, 98, 100 and 102 are in fluid communication with other associated passageways in order to deliver fluid to their respective components as will be described below in more detail.

Figure 4:
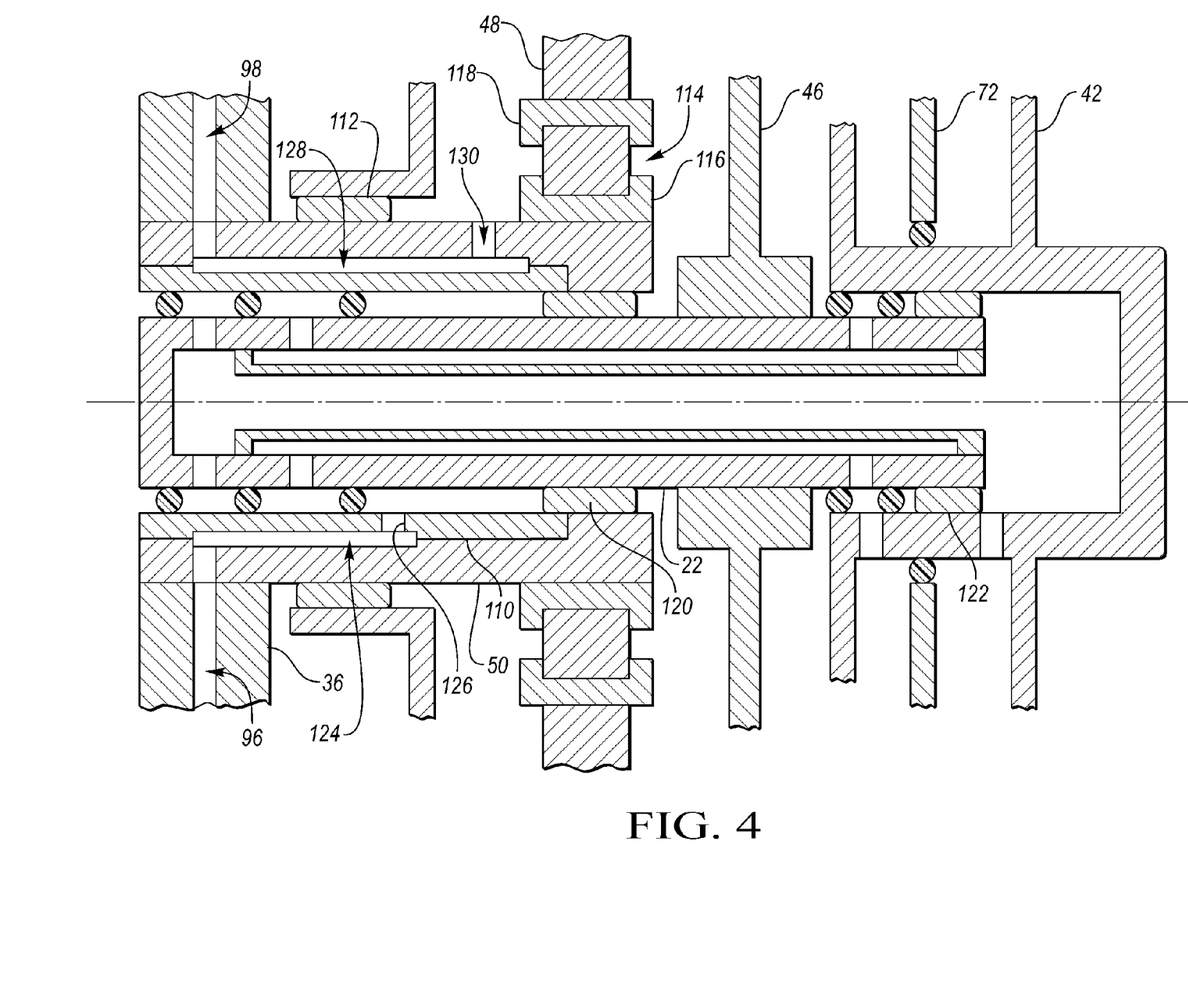
FIG. 4 is cross section of a central portion of a torque-converter assembly.

FIG. 4 illustrates the fluid pathways used to supply fluid to the hydrodynamic chamber 44. The stator support shaft 50 is a hollow shaft fixed to the front support 36. A hollow stator insert 110 is fixed to the interior of the stator support shaft 50. The impeller 40 is supported for rotation about the stator support 50 by bearings or a bushing 112. A one-way clutch 114 has an inner race 116 fixed to the stator support shaft 50 and an outer race 118 fixed to the stator 48. The turbine shaft 22 is supported for rotation with respect to the stator shaft by bearings 120 and for rotation with respect to the torque converter cover 42 by bearings or a bushing 122.

A groove is formed into the inner surface of stator shaft 50 and/or the outer surface of the insert 110 to form an axial passageway 124 connected to the radial passageway 96. The axial passageway continues through a hole 126 in the insert 110 into the space between the insert and the turbine shaft 22. Fluid is supplied to the hydrodynamic chamber 44 by the valve body through the radial passageway 96, axial passageway 124, between the bearings 120 and then into the hydrodynamic chamber 44 between the one-way-clutch 114 and the turbine 46.

Another groove is formed into the inner surface of stator shaft 50 and/or the outer surface of insert 110 to form an axial passageway 128 connected to the radial passageway 98. Fluid exits the hydrodynamic chamber 44 between the one-way clutch 114 and the impeller 40 through a hole 130 in the stator support shaft 50. From there, the fluid flows back to the valve body through the axial passageway 128 and the radial passageway 98.

Figure 5A:
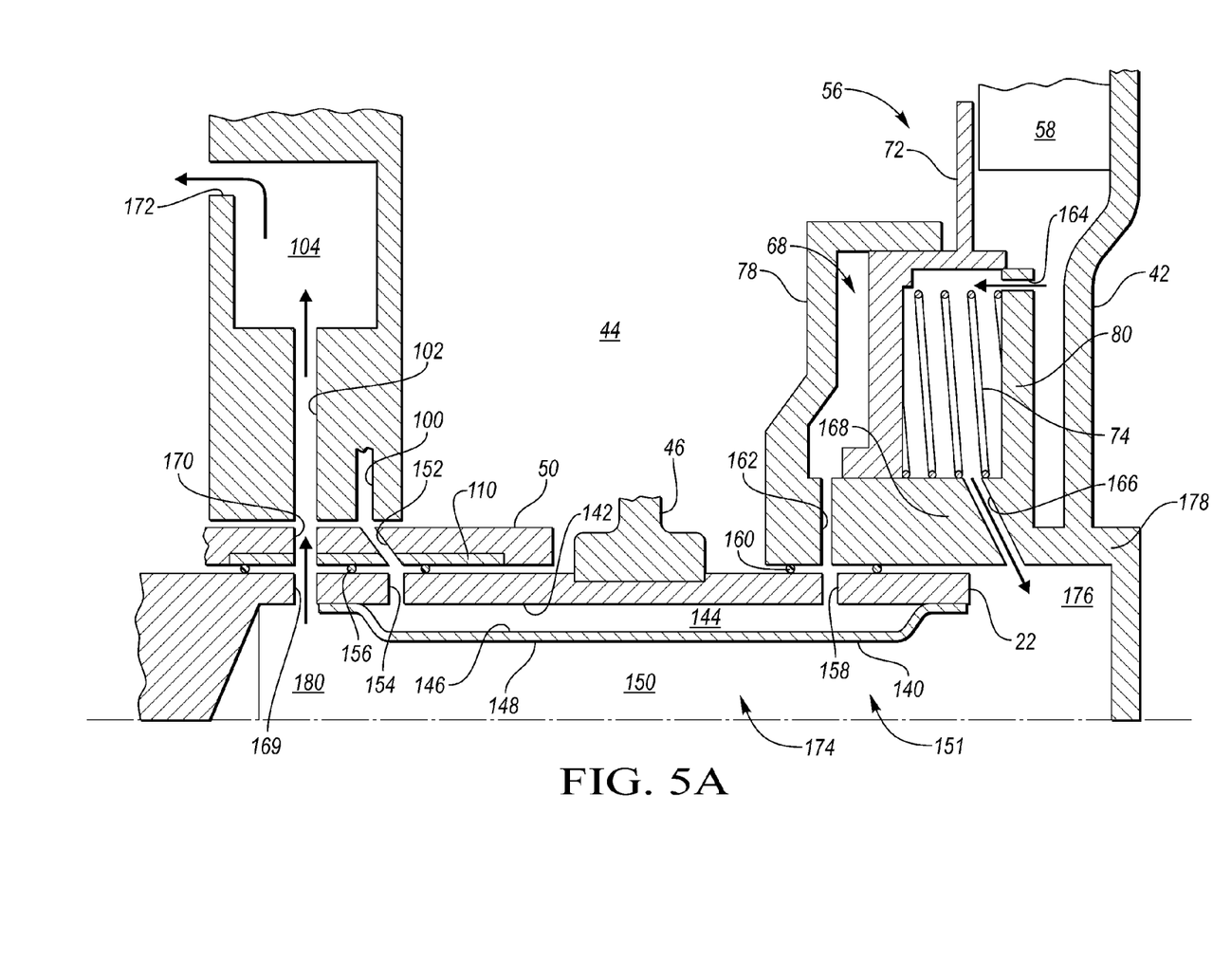
FIG. 5A is cross section of a torque-converter assembly with the bypass clutch disengaged.
Figure 5B:
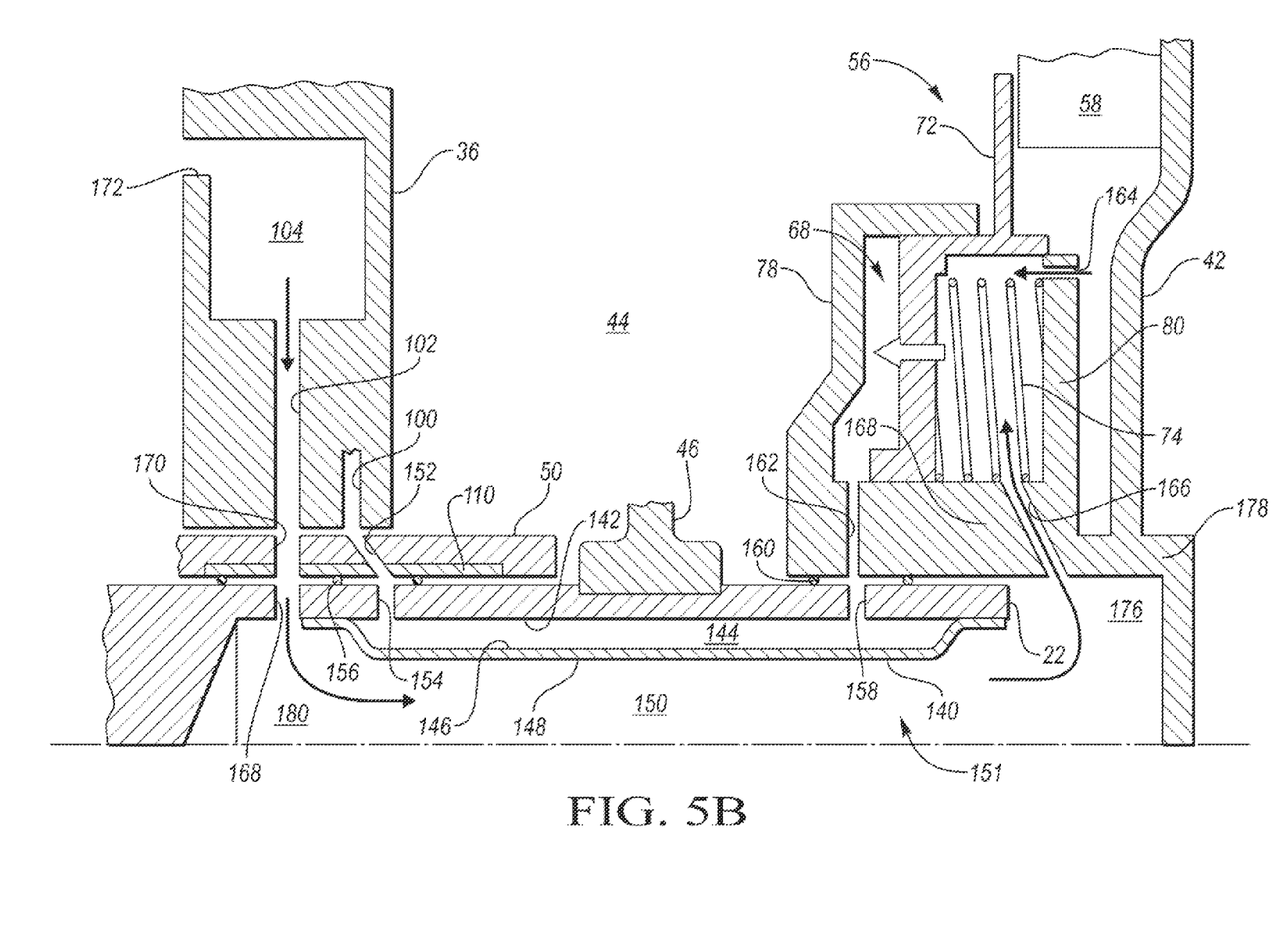
FIG. 5B is the cross section of FIG. 5A with the bypass clutch disengaging.

FIGS. 5A and 5B illustrate the fluid pathways for the apply chamber 68 and the balance chamber 70. The turbine shaft 22 is hollow and includes an inner surface 142 that defines an inner bore. A hollow turbine-shaft insert 140 is disposed within the bore and is fixed to the inner surface 142 such that an axial passage 144 is defined between the inner surface 142 of the shaft and the outer surface 146 of the insert. The inner surface 148 of the insert 140 defines another axial passageway 150.

Axial passageway 144 may be used to supply fluid to the supply chamber 68. The passageway 144 is in fluid communication with radial passageway 100. A hole 152 is defined through the stator shaft 50 and the insert 110 allowing fluid to travel from the radial passageway 100 through those components. Another hole 154 is defined in the turbine shaft 22 allowing the fluid to travel through the turbine shaft 22 and into axial passageway 144. A pair of seals 156 prevents fluid from flowing along the outside of the turbine shaft 22. Another hole 158 is defined in the turbine shaft 22 to allow fluid to flow into the supply chamber 68 via an hole 162, which is disposed between a pair of seals 160. When the controller determines that the clutch 56 should be applied, the valve body sends fluid through the radial passageway 100, to the axial passageway 144, through the hole 162 and into the apply chamber 68 to stroke the piston 72 causing the clutch plates in the clutch pack 58 to frictionally engage. When the piston 72 is de-stroked, fluid is forced out of the apply chamber 68 through the hole 162 and back to the valve body via axial passageway 144 and radial passageway 100.

The balance chamber 70 may include a orifice 164 defined in portion 80 of the cover 42, and a hole 166 defined in portion 168 of the cover 42. The orifice 164 places the balance chamber 70 in fluid communication with the hydrodynamic chamber 44. The orifice is generally a supply port that allows fluid from the hydrodynamic chamber 44 to accumulate within the balance chamber 70. *Used herein, "orifice" refers to a hole or passageway intentionally sized to create a flow restriction, or a pressure difference between the fluid chambers connected by the orifice.

The hole 166 is generally a return port that allows fluid to flow out of the balance chamber 70, but also acts as an inlet port when the piston 72 is de-stroked. The hole 166 may be substantially larger than the orifice 164. For example orifice 164 may be 0.5 mm and hole 166 may be 4 mm.

The hole 166 is in fluid communication with a fluid circuit 151 that allows fluid to drain from the balance chamber 70 to the transmission sump. The fluid circuit predominantly acts as an exhaust circuit for the balance chamber, but also acts as a supply circuit during some operating conditions, such as during de-stroking of the piston. The fluid circuit 151 may include an on-axis reservoir 174 that is comprised of axial passage 150, a void 176 that is defined in a nose portion 178 of the cover, and a void 180 that is defined by the turbine shaft 22 rearward of the insert 140.

The on-axis reservoir 174 is in fluid communication with the radial passageway 102 via a hole 169 defined in the turbine shaft 22 and a hole 170 defined through the stator shaft 50 and the insert 110. The radial passageway 102 may be in fluid communication with an elevated off-axis reservoir 104. The off-axis reservoir 104 may include an elevated exhaust 172 that allows fluid to exit the off-axis reservoir 104 and drain to the transmission sump. By elevating the off-axis reservoir 104 and the exhaust 172, the passageway 102 remains filled with fluid when the vehicle is off and the transmission pump is not operating, and helps prevent air from getting into the fluid circuit 151.

The fluid circuit 151 may have a volume that is greater than or equal to a volume of the balance chamber 70 to prevent air from being sucked into the balance chamber 70 during de-stroking of the piston 72. While FIGS. 5A and 5B illustrate a transmission having both on-axis and off-axis reservoirs, it is to be understood that other embodiment may only have an on-axis reservoir or an off-axis reservoir. In some embodiments, orifice 164 is omitted and radial passageway 102 is supplied with low pressure fluid by the valve body to send fluid to the balance chamber.

FIG. 5A illustrates the lockup clutch 56 operating in a steady-state, disengaged condition. In the illustrated embodiment, a steady supply of fluid flows into the balance chamber 70 from the hydrodynamic chamber 44 through orifice 164. Orifice 164 is sized such that the flow rate of fluid into the balance chamber is low to reduce the amount of wasted fluid circulating through the system. For example, the flow rate through the orifice 164 may be 100 to 200 cubic centimeters per minute. The flow of fluid into the balance chamber creates a pressure differential that forces fluid out of the balance chamber 70, through hole 166 and into the off-axis reservoir 104 via fluid circuit 151. Fluid flows out of the reservoir 104 and back to the sump via the exhaust 172.

FIG. 5B illustrates the lockup clutch 56 as the clutch is being disengaged. The spring 74 forces the piston 72 to move (i.e., de-stroke) towards the supply chamber 68 when the clutch is disengaged. De-stroking of the piston 72 creates a suction in the balance chamber 70. Because the supply orifice 164, which provides fluid from the hydrodynamic chamber 44 into the balance chamber 70, is small, fluid from the hydrodynamic chamber 44 cannot quickly refill the balance chamber 70 during de-stroking of the piston 72. The hole 166 is substantially larger than the orifice 164: thus the suction draws the fluid from the fluid circuit 151 into the balance chamber 70 to refill the balance chamber as the piston 72 de-strokes. The fluid circuit 151 has a volume that is greater than the volume of the balance chamber and thus the fluid circuit 151 contains enough fluid to completely refill the balance chamber during de-stroking of the piston. This prevents air from being drawn into the circuit 151 through the exhaust port 172.

Figure 6:
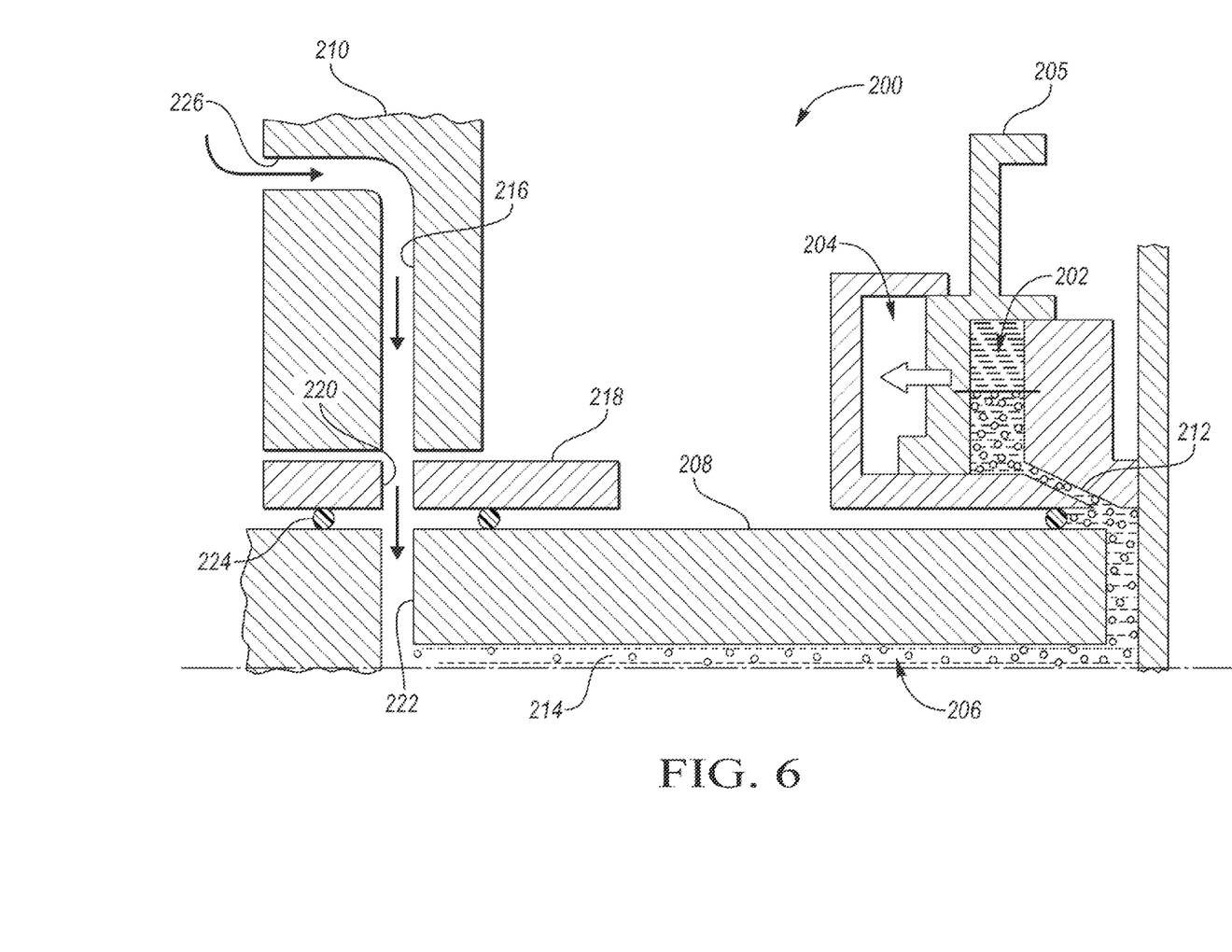
FIG. 6 is cross section of a portion of another torque-converter assembly.

FIG. 6 illustrates a transmission 200 that does not include any reservoirs and has a balance-chamber circuit with a smaller volume than the balance chamber. Similar to the transmission described above, transmission 200 includes a lockup clutch having an apply chamber 204, a balance chamber 202, and a piston 205. The balance chamber 202 includes a fluid circuit 206 that extends through an interior of the turbine shaft 208 and into the front support 210. The fluid circuit 206 includes several segments including an orifice 212, an axial passage 214, and a radial passage 216. Holes 220, 222 are defined in the stator support 218 and the turbine shaft 208, respectively, allowing fluid to flow between the radial passage 216 to the axial passage 214. A pair of seals 224 sandwich the holes.

The piston 205 is in the process of de-stroking and is moving away from the balance chamber 202 toward the apply chamber 204, which creates suction in the balance chamber 202. Because the supply orifice, which provides fluid from the hydrodynamic chamber into the balance chamber, is small, fluid from the hydrodynamic chamber cannot quickly refill the balance chamber during de-stroking of the piston. The orifice 212 is substantially larger than the supply orifice: thus the suction draws the fluid from the fluid circuit 206 into the balance chamber 202 to refill it as the piston de-strokes. The fluid circuit 206 has a smaller volume than the balance chamber 202 and therefore does not contain enough fluid to completely refill the balance chamber. The exhaust 226 is open to the air allowing air to be drawn into the balance chamber 202. When the balance chamber contains air, the supply chamber 204 and the balance chamber 202 are not centrifugally balanced and is difficult to control the lockout clutch. The balance chamber 202 remains unbalanced until fluid from the hydrodynamic chamber refills the balance chamber 202. The time to refill is dependent upon the flow rate into the balance chamber. Increasing the flow rate reduces the refill time, but increases wasted fluid flow during steady-state operation, which results in decreased fuel economy. At least some of the embodiments of the present disclose include a balance-chamber fluid circuit that has a volume that is greater than the volume of the balance chamber. (See FIG. 5A for example.) This prevents air from being drawn into the balance chamber through the exhaust port.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    a case including a front support defining a reservoir and a first passageway in fluid communication with the reservoir;
    a torque converter including an impeller, a turbine and a stator;
    a bypass clutch disposed within the torque converter and including a piston disposed between a balance chamber and an apply chamber, wherein the clutch fixes the turbine to the impeller in response to fluid pressure in the apply chamber exceeding fluid pressure in the balance chamber;
    a hollow stator shaft fixed to the front support; and
    a turbine shaft driveably connected to the turbine, extending through the stator shaft, and defining a second passageway in fluid communication with the first passageway and the balance chamber, wherein the reservoir, the first passageway, the second passageway and the balance chamber are arranged such that fluid travels from the reservoir to the balance chamber when the piston is de-stroked.

2. The transmission of claim 1 wherein a volume of the reservoir is greater than a volume of the balance chamber.

3. The transmission of claim 1 wherein the reservoir further includes an elevated exhaust defined in a top of the reservoir.

4. The transmission of claim 1 wherein the reservoir is a cavity defined in a wall of the front support.

5. The transmission of claim 1 further comprising a turbine-shaft insert fixed to an inner wall of the turbine shaft such that a gap is defined between the inner wall of the turbine shaft and an outer wall of the insert creating a third passageway, wherein the second passageway is defined by an inner wall of the insert.

6. The transmission of claim 1 wherein the front support further defines a third passageway in fluid communication with a valve body of the transmission, and the transmission further comprises a turbine-shaft insert fixed to an interior of the turbine shaft such that a gap is defined between an inner wall of the turbine shaft and an outer wall of the insert, wherein the gap is in fluid communication with the third passageway and the apply chamber, and the valve body is configured to supply fluid to the apply chamber via the third passageway and the gap to stroke the piston.

7. The transmission of claim 6 wherein the front support further defines a fourth passageway and a fifth passageway, and the transmission further comprises a stator-shaft insert fixed to an inner wall of the stator shaft such that a second gap is defined between the stator shaft and the stator-shaft insert and such that a third gap is defined between the stator-shaft insert and the turbine shaft, wherein the fourth passageway is in fluid communication with the second gap, and the fifth passageway is in fluid communication with the third gap.

8. The transmission of claim 1 wherein the torque converter further includes a cover having a portion that cooperates with the piston to define the supply and balance chambers.

9. A transmission comprising:
    a torque converter including a clutch having a piston, and balance and apply chambers partitioned from a hydrodynamic chamber of the torque converter;
    a hollow turbine shaft extending into a nose portion of the torque converter; and
    an on-axis reservoir defined within the turbine shaft and the nose portion, and in fluid communication with the balance chamber such that fluid from the reservoir refills the balance chamber when the piston is de-stroked.

10. The transmission of claim 9 wherein the torque converter further includes an impeller, a turbine and a stator disposed within the hydrodynamic chamber, and wherein the turbine is connected to the turbine shaft.

11. The transmission of claim 9 further comprising a front support that defines an elevated exhaust port and a passageway that connects the exhaust port and the reservoir in fluid communication such that fluid is capable of flowing from the reservoir and to the exhaust port.

12. The transmission of claim 9 wherein a volume of the on-axis reservoir is greater than or equal to a volume of fluid exhausted from the balance chamber when the piston is stroked.

13. The transmission of claim 9 further comprising a front support that defines an off-axis reservoir and a passageway that connects the off-axis reservoir and the on-axis reservoir in fluid communication.

14. The transmission of claim 9 further comprising a turbine-shaft insert fixed to an inner wall of the turbine shaft such that a gap is defined between the inner wall of the turbine shaft and an outer wall of the insert creating a passageway in fluid communication with the supply chamber and a valve body such that fluid is sent from the valve body to the supply chamber to stroke the piston, wherein the insert has an inner wall the defines at least a portion of the on-axis reservoir.

15. The transmission of claim 14 further comprising:
a hollow stator shaft that receives the turbine shaft; and
a stator-shaft insert fixed to an inner wall of the stator shaft such that a second gap is defined between the stator shaft and the stator-shaft insert and such that a third gap is defined between the stator-shaft insert and the turbine shaft, wherein the second and third gaps are in fluid communication with the hydrodynamic chamber to circulate fluid through the hydrodynamic chamber.

16. A transmission comprising:
a torque converter including a clutch having a piston, and balance and apply chambers partitioned from a hydrodynamic chamber of the torque converter;
a front support defining a reservoir having an elevated exhaust; and
a turbine shaft extending through the front support and defining a passageway in fluid communication with the balance chamber and the reservoir such that fluid from the reservoir refills the balance chamber when the piston is de-stroked.

17. The transmission of claim 16 wherein the front support defines a second passageway in fluid communication with the reservoir and the passageway.

18. The transmission of claim 16 wherein a combined volume of the reservoir and the passage way is greater than or equal to a volume of fluid exhausted from the balance chamber when the piston is stroked.

19. The transmission of claim 16 wherein the balance chamber, the passageway, the reservoir and the elevated exhaust are arranged in fluid communication such that, during steady-state disengaged operation of the clutch, fluid flows from the balance chamber, to the reservoir via the passageway, and through the elevated exhaust to a sump of the transmission.

20. The transmission of claim 16 further comprising an insert fixed to an inner wall of the turbine shaft such that a gap is defined between the inner wall of the turbine shaft and an outer wall of the insert creating a second passageway in fluid communication with the supply chamber and a valve body such that fluid is sent from the valve body to the supply chamber to stroke the piston, wherein the insert has an inner wall that defines the passageway.

* * * * *